June 30, 1959

H. SCHONFELD 2,892,376

SPLIT BOLT RADIALLY EXPANDABLE TO SIZE AND
LOCKED BY MEANS OF TAPERED CORE PIN

Filed Feb. 23, 1955

INVENTOR.
Henry Schonfeld
BY
ATTORNEY

United States Patent Office 2,892,376
Patented June 30, 1959

2,892,376

SPLIT BOLT RADIALLY EXPANDABLE TO SIZE AND LOCKED BY MEANS OF TAPERED CORE PIN

Henry Schonfeld, Richmond Hill, N.Y.

Application February 23, 1955, Serial No. 490,046

2 Claims. (Cl. 85—2)

This invention relates to threaded bolts. It aims to provide a simple, economical three part bolt which can be assembled with a nut much more rapidly than conventional one piece bolts, without the use of a wrench, and which in addition provides a fit between the threads of the nut and bolt which is much tighter than it is possible to obtain with similar threads on conventional bolt and nut assemblages.

It has been proposed to provide a split bolt consisting of two bolt halves and a locking member or members, so that the shanks of the bolt halves can be passed through a hole in an object to be secured, and then through the opening in the nut, so that the nut can be positioned relative to the bolt in locking position, and the locking member can then be inserted between the two halves. Such bolts have not come into any substantial use because they are complicated to use, and are more expensive than ordinary bolts both in cost of manufacturing and cost of use.

I have invented a three part bolt which can be assembled with a nut much more rapidly than a conventional bolt, can be tightly assembled without a wrench, and which can be manufactured as an inexpensive pressed bolt to give results comparable with those obtained with the highest grade precision machined bolts.

The bolt I have invented can best be described as an ordinary bolt having an axial bore, slightly tapered from top to bottom, with a section at least as wide as the thread depth cut longitudinally down the center of the bolt to cut the bolt into two truncated matching pieces, and a locking member comprising a cylinder tapered to fit the axial bore, having a slightly tapered cross piece adjacent its top whose cross sectional area approximates the section cut out of the bolt head.

The invention is shown in the accompanying drawings, in which

Figure 4:
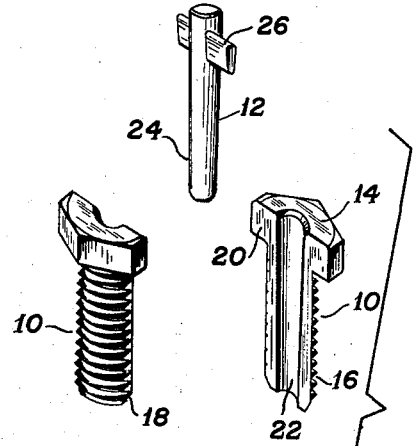
Fig. 4 is an exploded view of the parts of the bolt and nut assembly.

Referring to Fig. 4, my new bolt comprises identical parts 10, and a locking piece 12. The parts 10 each has a head portion 14 and a shank portion 16, with threads 18 cut into it. A flat face 20, with a center bore 22 in it, completes each part 10. If the flat faces 20 are placed next to each other, a somewhat flattened out bolt is simulated; if they are separated by a distance "d," the outer edges of the two pieces 10 describe a single complete bolt, with the threads interrupted at the place where metal is replaced by air. In this position, the bores 22 form the walls of a tapered cylinder.

Figure 2:
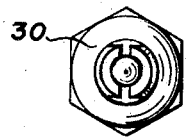
Fig. 2 is a bottom view of the assembly.
Figure 3:
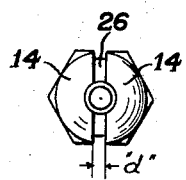
Fig. 3 is a top view of the assembly.

As will be noted in Fig. 2, both edges 40 of the flat face 20 in the shank portion 16 are cut away slightly on planes perpendicular to the plane of the surface 20, to permit clearance of the bolt shank through the hole in the nut 30.

The locking piece 12 is essentially a tapered cylinder 24, which fits the tapered cylinder formed by the bores 22 when the pieces 10 are held a distance "d" apart. A tapered cross piece 26 is approximately as wide as the head of the bolt, and at its top has a thickness of "d." Thus, when the pieces 10 are clamped about the piece 12, with the cross piece 26 held in the head of the bolt, the result looks much like a standard bolt.

It should be noted that the dimension "d" is at least the depth of the thread 18 measured along a line perpendicular to a flat face 20 at its longitudinal edge along the shank, so that when one piece 10 is run through the nut 30, and pressed into position, the second piece will fit into the remaining space, and clear the threads.

The taper on the cylinder 24 and bore 22 should be sufficient to provide a self-holding device i.e. from about ½" to ⅝" per foot depending on length. These tapers have been standardized by the American Standards Association and are well known. They are sufficiently small to keep the pin in position by friction, while at the same time sufficiently large to give a desired spread to the device, to get a better fit than is possible with one piece devices.

Figure 1:
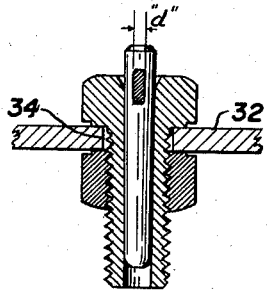
Fig. 1 is a section through a bolt and nut assembly, showing the complete assembly.

To produce the assembly shown in Fig. 1, the nut 30 is positioned adjacent the sheet 32 to be held. One piece 10 is dropped through the hole 34 in the sheet 32 and through the hole in the nut. The threads are engaged, and the outer piece 10 is pushed through, with the faces 20 in contact so that the screw threads will clear. When in position, it too is pushed so the threads are engaged. I now have an opening in the head of the bolt with a width "d," and a tapered bore which is wider at the top than at the bottom. The piece 12 is slid into the bore, until the cross piece 26 fits into the opening in the head of the nut. At this point, it is jammed down with the fingers, or with a hammer, and the assemblage is complete. No wrench is necessary. It is possible to get a tight enough fit so that a wrench is needed to break the seal merely by finger pressure. With a proper setting, an almost unbreakable seal can be obtained by the use of a hammer to drive home the locking piece 12.

The threads of the bolt and nut can be crudely prepared, as for an American Standard Class 1 fit; they can be crudely machined, or even pressed. But the assemblage produces a Class 4 fit, heretofore only attainable by precision machine work (tolerances about ¼ of those in a Class 1 fit). I believe this improvement in fit is due to the taper in the locking piece, which more than compensates for any inaccuracy in the threads.

It should also be noted that after assembly, the bolt head is a regular hexagon of standard size, and will fit any standard wrench. Furthermore, it is a solid hexagon, which will not deform under pressure from the wrench. Hence, a standard wrench can be used to disassemble the piece. Or the piece can be disassambled by using a hammer and tap on the bottom of the piece 12, driving it out and thus unlocking the device.

Obviously, changes can be made in the specific device described herein without departing from the scope of my invention as defined in the claims.

I claim:

1. A threaded bolt comprising three elements which together with a nut product a bolt-nut assembly capable of being loosened with a wrench like a standard assembly of a unitary bolt and nut, two of said members comprising a pair of matching pieces each approximating a longitudinal half of a standard bolt having a polygonal head and a threaded shank, reduced in size by (a) a first longitudinal section through the center of the entire bolt at least as thick as the depth of the thread measured along a line perpendicular to the longitudinal edge of the shank portion of the section, and (b) by two sections along the longitudinal edges of the shank portions of the first section sufficiently large to permit the shank of each of said members to pass through the opening in a nut when the shank of the other half is seated in the threads of the nut, the matching pieces having also half and axial bore at the center of the bolt tapered from head to foot, the matching pieces thus presenting flat matching T-shaped surfaces spaced slightly apart from each other on assembly, with a tapered bore in the center, and a third locking member comprising a tapered cylinder fitting the tapered bore and sufficiently large so that the matching members are spread apart and forced into tight locking relationship with the nut when the locking member is forced far enough into the assembly, the taper being sufficiently small so as to be self-holding, the locking member having also a slightly tapered cross piece at its head approximating the section absent from the bolt head, so that on assemblage of the members the assembled bolt has a substantially solid polygonal head which may be manipulated with a wrench.

2. The threaded fastener of claim 1, in which the bolt and nut have threads therein which would normally produce an American Standard Class 1 fit, but which produce an American Standard Class 4 fit by reason of the three part construction of the bolt.

References Cited in the file of this patent

UNITED STATES PATENTS

| | | |
|---|---|---|
| 601,553 | Christensen | Mar. 29, 1898 |
| 643,792 | Gates | Feb. 20, 1900 |
| 990,065 | Sargeant | Apr. 18, 1911 |
| 1,011,398 | Andregg | Dec. 12, 1911 |
| 1,087,759 | Gould | Feb. 17, 1914 |
| 1,409,817 | Biltmerman | Mar. 14, 1922 |
| 2,479,075 | Martin | Aug. 16, 1949 |
| 2,693,732 | Durst | Nov. 9, 1954 |

FOREIGN PATENTS

| | | |
|---|---|---|
| 137,696 | Great Britain | Jan. 22, 1920 |
| 839,404 | France | Jan. 4, 1939 |